United States Patent [19]
Hayakawa

[11] Patent Number: 5,596,348
[45] Date of Patent: Jan. 21, 1997

[54] INPUT APPARATUS

[75] Inventor: Masaharu Hayakawa, Nagaokakyo, Japan

[73] Assignee: Mitsubishi Denki Kabushiki Kaisha, Tokyo, Japan

[21] Appl. No.: 378,941

[22] Filed: Jan. 26, 1995

Related U.S. Application Data

[63] Continuation of Ser. No. 21,983, Feb. 24, 1993, abandoned.

[30] Foreign Application Priority Data

Feb. 26, 1992 [JP] Japan ..................................... 4-039747

[51] Int. Cl.$^6$ ....................................................... G09G 1/06
[52] U.S. Cl. .......................... 345/146; 345/156; 348/163
[58] Field of Search ..................................... 348/563, 564, 348/569, 570; 345/156, 162, 168, 146, 902, 212, 169; 395/156; 358/335; H04N 5/445, 5/45

[56] References Cited

U.S. PATENT DOCUMENTS

| | | |
|---|---|---|
| 4,202,038 | 5/1980 | Peterson ..................................... 341/21 |
| 4,445,169 | 4/1984 | Wakita et al. . |
| 4,519,003 | 5/1985 | Scholz . |
| 4,847,696 | 7/1989 | Matsumoto et al. . |
| 4,908,713 | 3/1990 | Levine . |
| 4,947,244 | 8/1990 | Fenwick et al. ........................... 348/12 |
| 5,189,403 | 2/1993 | Franz et al. .............................. 340/711 |

FOREIGN PATENT DOCUMENTS 0247380  12/1987  European Pat. Off. .

*Primary Examiner*—Kee M. Tung
*Assistant Examiner*—Doom Chow

[57] ABSTRACT

An input apparatus has a selection key for inputting a signal on the basis of an operation, a timer which is reset by an input of a signal from the selection key and which measures a predetermined time period, and a controller for inputting first conditions such as a menu selection on the basis of an input of a signal from the selection key, and for inputting second conditions such as a menu decision on the basis of an output of the timer. The first conditions are input on the basis of an input of a signal from the selection key, so that an operation such as a menu selection is done. When the selection key is not operated for a time period longer than the predetermined time period set in the timer, the second conditions are input, so that an operation such as a menu decision is done.

43 Claims, 8 Drawing Sheets

INPUT APPARATUS

This application is a continuation of application Ser. No. 08/021,983 filed on Feb. 24, 1993, now abandoned.

BACKGROUND OF THE INVENTION

1. Field of the Invention

This invention relates to an input apparatus, and more particularly to an input apparatus which is suitable for easily inputting many operation items with a small number of keys when an audio-visual (AV) apparatus such as a television receiver and a video tape recorder is operated using a remote controller while a menu of operation items is displayed on a display screen.

2. Description of the Related Art

FIG. 1 is a diagram showing the configuration of a conventional input apparatus. In the Figure, 1 designates input key pad including a menu key 11, a selection key 12 and a decision key 13, 2 designates a controller which receives input signals from the input key pad 1 to control a control object (not shown) and perform other controls relating to inputs, and 3 designates a display controller which receives from the controller 2 display contents for informing the operator of operation guidance and which performs the superimpose process or the like on the television screen to display the contents on a display device 4.

The operation of the thus configured input apparatus will be described with reference to FIG. 2. FIG. 2 is a diagram showing an example of a menu screen which is displayed on the display device 4 for operating a video tape recorder (VTR) using the input apparatus of FIG. 1.

At first, in order to call a menu for showing the operator the items to be operated through the input key pad 1, the menu key 11 is pressed. Then, the controller 2 enters the selection input mode so that the menu screen shown in FIG. 2 is superimposed on the television screen of the display device 4 through the display controller 3. When the operator presses again the menu key 11 of the input key pad 1 under this state, the controller 2 controls the display controller 3 so as to halt the display of the menu screen on the display device 4. In this example, "TIMER RECORDING MENU" is displayed on the display device 4.

While judging whether the displayed menu screen includes an item to be operated, the operator operates the selection key 12 of the input key pad 1. Each time the selection key 12 is pressed, the controller 2 controls the display controller 3 so that other control items are sequentially displayed as a menu screen on the display device 4. As a result of several operations of the selection key 12, for example, "TIMER RECORDING MENU" shown in FIG. 2 is displayed In this example, "DAY OF RECORDING", "CHANNEL", "STARTING TIME", "ENDING TIME", etc. can be selected, and at first a cursor is positioned at the item of the day when the timer recording is to be done.

When the operator presses the decision key 13 under this state, the controller 2 judges that the timer recording reservation is to be done. Then, in order to input the day of timer recording which is the first item to be reserved, the controller 2 controls the display controller 3 so that a menu including items of "MON", . . . "SUN" as candidates is displayed on the display device 4. Each time the selection key 12 is pressed, the controller 2 controls the display controller 3 so that the cursor pointing to one of the items of "MON", . . . "SUN" is moved on the screen of the display device 4. Namely, the operator can select the desired day by pressing the selection key 12 to move the cursor on the menu screen. After the selection key 12 is pressed several times to move the cursor to the item of the desired day, for example, "MON", the decision key 13 is pressed to decide the reservation at that day. In order to reserve "CHANNEL", the controller 2 then controls the display controller 3 so that a screen for reserving the channel is displayed on the display device 4.

Similarly, the controller 2 controls the display controller 3 so that all the channels which can be selected are displayed in the screen for reserving the channel on the display device 4. The channel to be reserved is selected by operating the selection key 12 and the channel selection is decided by pressing the decision key 13.

In accordance with the key operations performed by the operator, then, other items such as the record starting time and the record ending time are selected and decided in a similar manner. Thereafter, the screen on the display device 4 returns to "TIMER RECORDING MENU". Under this state, displayed are the input contents relating to all the items which are required for the timer recording reservation, for example, "DAY OF RECORDING" is "MON", "CHANNEL" is "12 CH", "STARTING TIME" is "P.M. 10:15", and "ENDING TIME" is "P.M. 11:30".

When the operator presses the selection key 12 under this state, the controller 2 controls the display controller 3 so that a menu for selecting other items is displayed on the display device 4 to show the operator the operation of other items. When the decision key 13 is pressed, the menu for the operations of setting the timer for recording which starts from the reservation of the day of timer recording is again shown, and, when the menu key 11 is pressed, the menu is erased and the input operation is ended.

As described above, while viewing the display on the display device 4, the operator selects the required item using the selection key 12 and decides it by pressing the decision key 13, whereby the required item can be easily input.

In the above, an example of the operation procedure has been described. Alternatively, the required item may be input through the guidance of the menu screen by, for example, the following process: the menu screen is changed each time the menu key 11 is pressed, the selection items displayed in the menu screen are changed each time one of the selection items is selected using the selection key 12, and the input of the required item is decided by pressing the decision key 13. These processes may be set by programs built in the controller 2.

As described above, the conventional input apparatus is so constructed that the desired conditions are input by simultaneously performing the following operations: pressing the input key pad 1 including at least three keys, the menu key 11, selection key 12 and decision key 13; viewing the menu screen displayed on the display device 4 which is controlled by the controller 2 through the display controller 3; and selecting the required candidate. In the input operation, therefore, the operator must operate the input key pad 1 near at hand while viewing the menu screen on the display device 4. This introduces problems that the input operation is complicated and requires a prolonged time period, and that there is the considerable possibility of input errors.

SUMMARY OF THE INVENTION

The primary object of the invention is to provide an input apparatus through which many operation items can be easily and rapidly input using a single key.

The input apparatus of the invention has: input means for inputting a signal on the basis of an operation; a timer which is reset by an input of a signal from the input means and measures a predetermined time period; and means for inputting first conditions such as a menu selection on the basis of an input of a signal from the input means, and for inputting second conditions such as a menu decision on the basis of an output of the timer. The first conditions are input on the basis of an input of a signal from the input means, so that an operation such as a menu selection is done. When a selection key is not operated for a time period longer than the predetermined time period set in the timer, the second conditions are input, so that an operation such as a menu decision is done.

The above and further objects and features of the invention will more fully be apparent from the following detailed description with accompanying drawings.

DESCRIPTION OF THE PREFERRED EMBODIMENTS

Hereinafter, the invention will be described with reference to the drawings showing embodiments.

Figure 1:
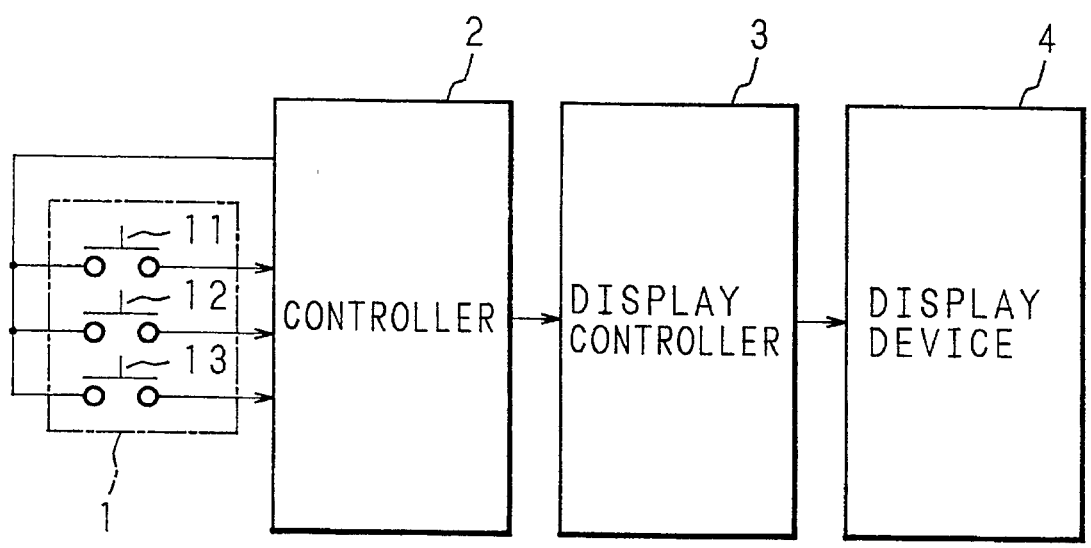
FIG. 1 is a diagram showing the configuration of conventional input apparatus.
Figure 3:
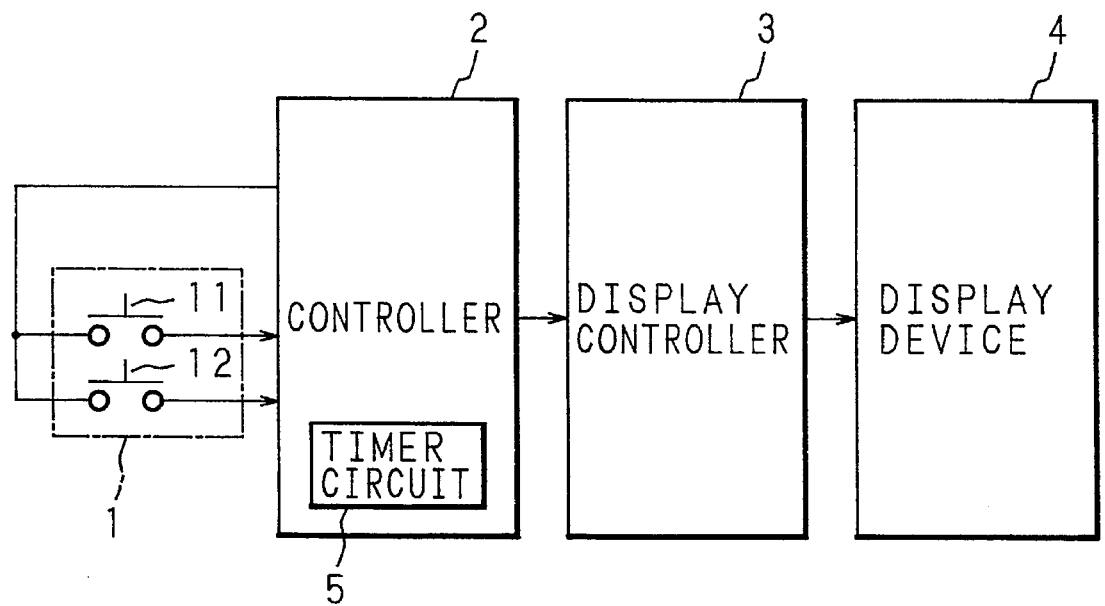
FIG. 3 is a diagram showing the configuration of an input apparatus of the invention.

FIG. 3 is a diagram showing the configuration of an embodiment of the invention. In FIG. 3, portions labeled by the same reference numerals as those in FIG. 1 designate the same portions in FIG. 1, and therefore their description is omitted. In FIG. 3, the reference numeral 5 designates a timer circuit built in the controller 2. The timer circuit 5 measures the time period during which the selection key 12 of the input key pad 1 is not operated.

Figure 2:
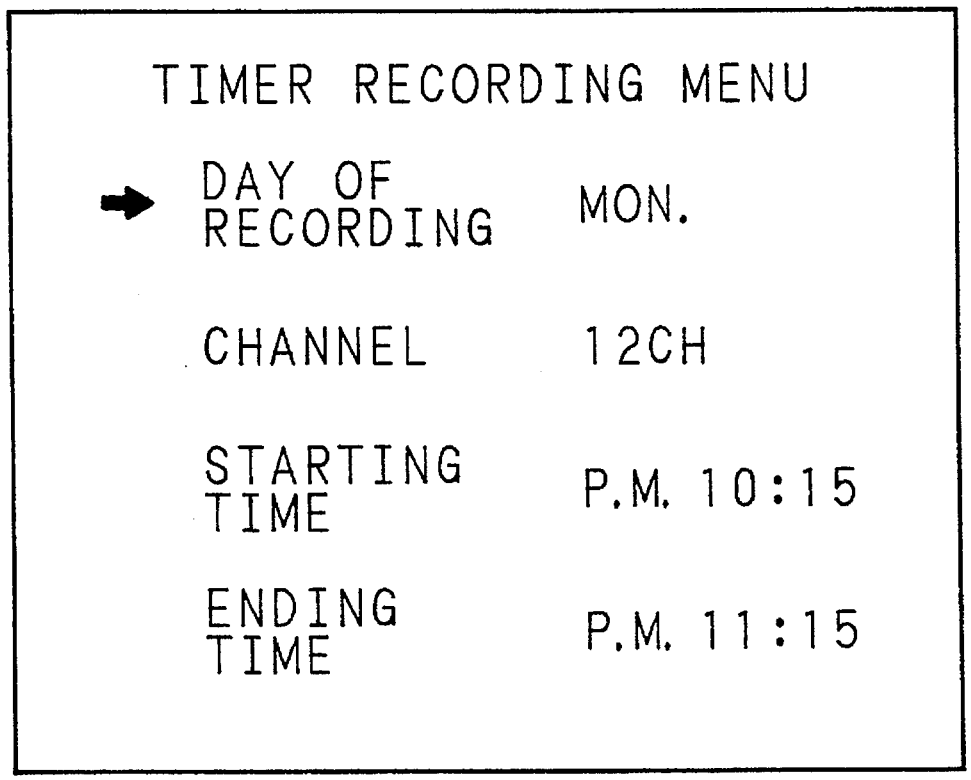
FIG. 2 is a diagram showing an example of a menu screen.

Next, the operation of the input apparatus will be described referring to the example of a display shown in FIG. 2.

In order to call a menu for showing the operator the items to be operated through the input key pad 1, the menu key 11 is pressed. Then, the controller 2 enters the selection input mode so that the menu screen shown in FIG. 2 is superimposed on the television screen of the display device 4 through the display controller 3, and a series of menu screens will be sequentially displayed. When the operator presses again the menu key 11 of the input key pad 1 under this state, the controller 2 controls the display controller 3 so as to halt the display of the menu screen on the display device 4. In this embodiment, "TIMER RECORDING MENU" is displayed on the display device 4.

While judging whether the displayed menu screen includes an item to be operated, the operator operates the selection key 12 of the input key pad 1. Each time the selection key 12 is pressed, the controller 2 controls the display controller 3 so that other control items are sequentially displayed as a menu screen on the display device 4. As a result of several operations of the selection key 12, for example, "TIMER RECORDING MENU" shown in FIG. 2 is displayed In this embodiment, "DAY OF RECORDING", "CHANNEL", "STARTING TIME", "ENDING TIME", etc. can be selected, and at first a cursor is positioned at the item of the day when the timer recording is to be done.

When the operator remains to perform no further operation, the timer circuit 5 of the controller 2 operates and the controller 2 judges that the operation to be done is the timer recording reservation. The controller 2 controls the display controller 3 so that a menu including items of "MON", . . . "SUN" as candidates is displayed on the display device 4. Each time the selection key 12 is pressed, the controller 2 controls the display controller 3 so that the cursor pointing to one of the items of "MON", . . . "SUN" is moved on the screen of the display device 4. Namely, the operator can select the desired day by pressing the selection key 12 to move the cursor on the menu screen. When the operator remains to perform no further operation after the selection key 12 is pressed several times to move the cursor key to the item of the desired day, for example, "MON", the timer circuit 5 of the controller 2 operates and the controller 2 decides the reservation of that day. Thereafter, in order to reserve "CHANNEL", the controller 2 then controls the display controller 3 so that a screen for reserving the channel is displayed on the display device 4.

Similarly, the controller 2 controls the display controller 3 so that all the channels which can be selected are displayed in the screen for reserving the channel on the display device 4. When the operator remains to perform no further operation after the channel to be reserved is selected by operating the selection key 12, the timer circuit 5 of the controller 2 operates and the channel selection is decided.

In accordance with the key operations performed by the operator, then, the other items such as the record starting time and the record ending time are selected and decided in a similar manner. Thereafter, the screen on the display device 4 returns to "TIMER RECORDING MENU". Under this state, displayed are the input contents relating to all the items which are required for setting the timer for recording, for example, "DAY OF RECORDING" is "MON", "CHANNEL" is "12 CH", "STARTING TIME" is "P.M. 10:15", and "ENDING TIME" is "P.M. 11:30".

When the operator presses the selection key 12 under this state, the controller 2 controls the display controller 3 so that a menu for selecting other items is displayed on the display device 4 to show the operator the operation of other items. When the operator remains to perform no further operation, the timer circuit 5 of the controller 2 operates and the menu for the operations of setting the timer for recording which starts from the reservation of the day of timer recording is again shown. When the menu key 11 is pressed, the menu is erased and the input operation is ended.

As described above, while viewing the display on the display device 4, the operator selects the required item using the selection key 12, and, when the operator remains to perform no further operation, this selected item is decided. For the selection and decision of an item, therefore, the input key pad 1 requires in principle only the selection key 12, thereby allowing the operator to input required items while viewing only the display device 4 and without sight of the input key pad 1.

In the above, an example of the operation procedure has been described. Alternatively, the required item may be input through the guidance of the menu screen by, for example, the following process: the menu screen is changed each time the menu key 11 is pressed, the selection items displayed in the menu screen are changed each time one of the selection items is selected using the selection key 12, and the selection key 12 is kept unoperated so that the elapse of the predetermined time period causes the timer circuit 5 to operate, thereby deciding the input of the required item. These processes may be set by programs built in the controller 2.

Figure 4:
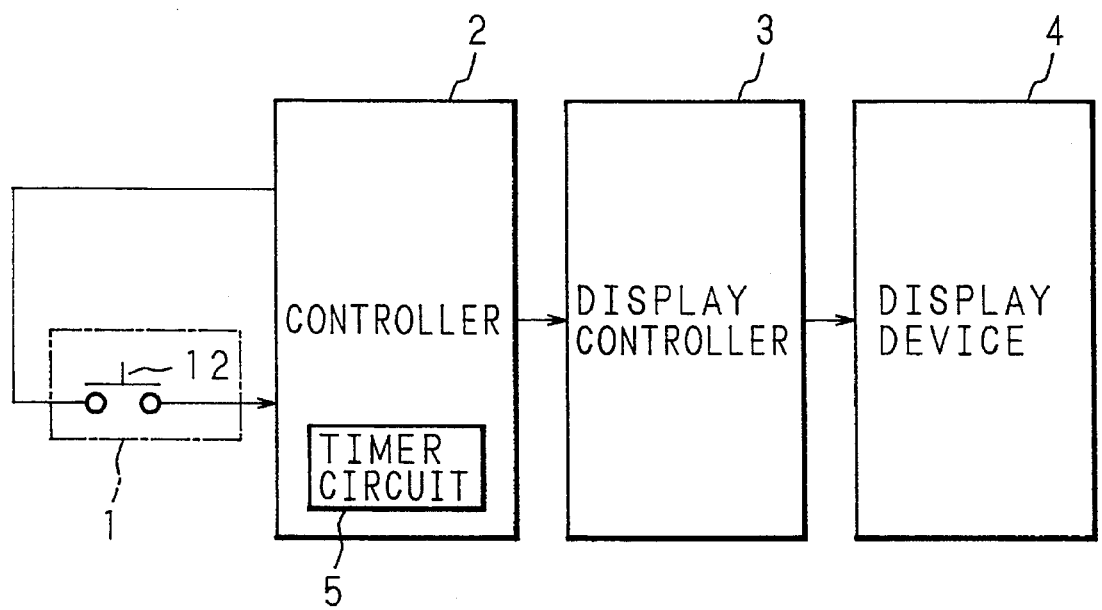
FIG. 4 is a diagram showing the configuration of another input apparatus of the invention.

FIG. 4 is a diagram showing the configuration of an input apparatus which is another embodiment of the invention. The embodiment of FIG. 4 is different from the embodiment of FIG. 3 in that the input key pad 1 is not provided with the menu key 11 or the input key pad 1 includes only the selection key 12.

The operation of the input apparatus of the embodiment will be described.

In order to call a menu for showing the operator the items to be operated through the input key pad 1, the selection key 12 is pressed. As a result, the controller 2 enters the selection input mode so that the menu screen shown in FIG. 2 is superimposed on the television screen of the display device 4 through the display controller 3. In this embodiment, "TIMER RECORDING MENU" is displayed on the display device 4.

The subsequent operations are in principle the same as those of the embodiment of FIG. 3 except the following: When the input operation using the menu screen is to be ended, the selection key 12 is allowed to stand without being operated. In accordance with the operation of the timer circuit 5, then, the controller 2 changes in sequence the menus, and, after all the menu screens have been displayed, automatically exits from the mode of displaying a menu screen. Therefore, only when the operator wishes to perform the input operation while viewing a menu screen, the operator is requested to operate the selection key 12 so as to input the required items.

According to the embodiment, since the input operation can be performed by operating only the selection key 12, the operation process is simpler than that of the embodiment of FIG. 3.

In the embodiments described above, when the selection key 12 is allowed to stand without being operated, the timer circuit 5 operates and the controller 2 controls the display controller 3 so as to change the contents of the display one after another. When the operator operates the input apparatus for the first time, therefore, there may arise an inconvenience that the menu is changed to another one before the operator comprehends the contents of the menu.

Figure 5:
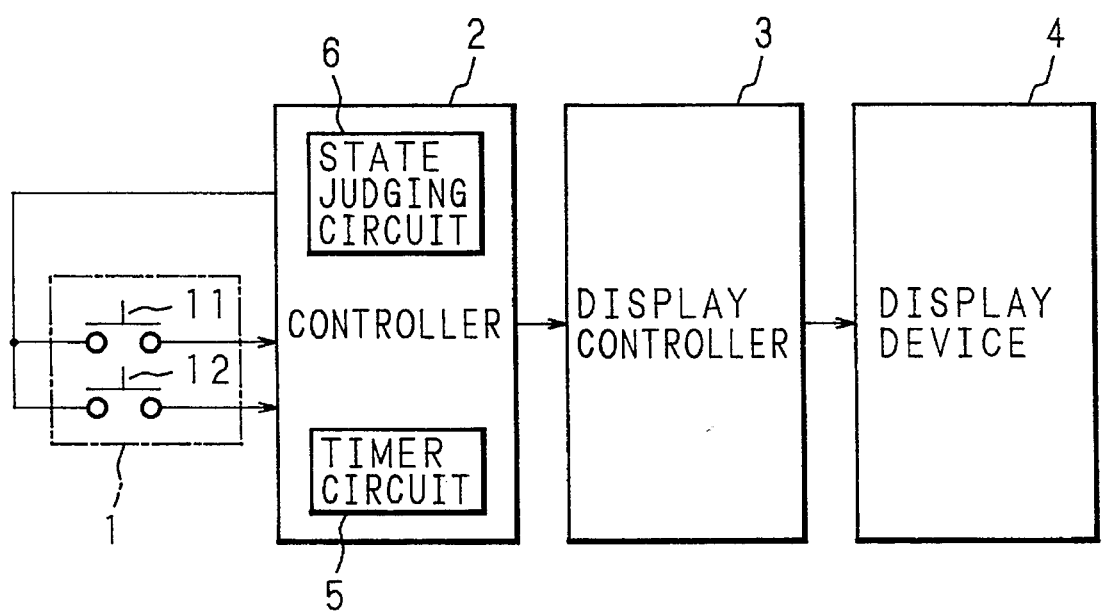
FIG. 5 is a diagram showing the configuration of a further input apparatus of the invention.

The configuration of a further embodiment of the invention which can obviate such an inconvenience is diagrammatically shown in FIG. 5. In FIG. 5, the reference numeral 6 designates a state judging circuit which judges whether or not the operation against the selection key 12 is performed for the first time on the menu screen. The other configuration of the embodiment is the same as that of FIG. 3.

Figure 6:
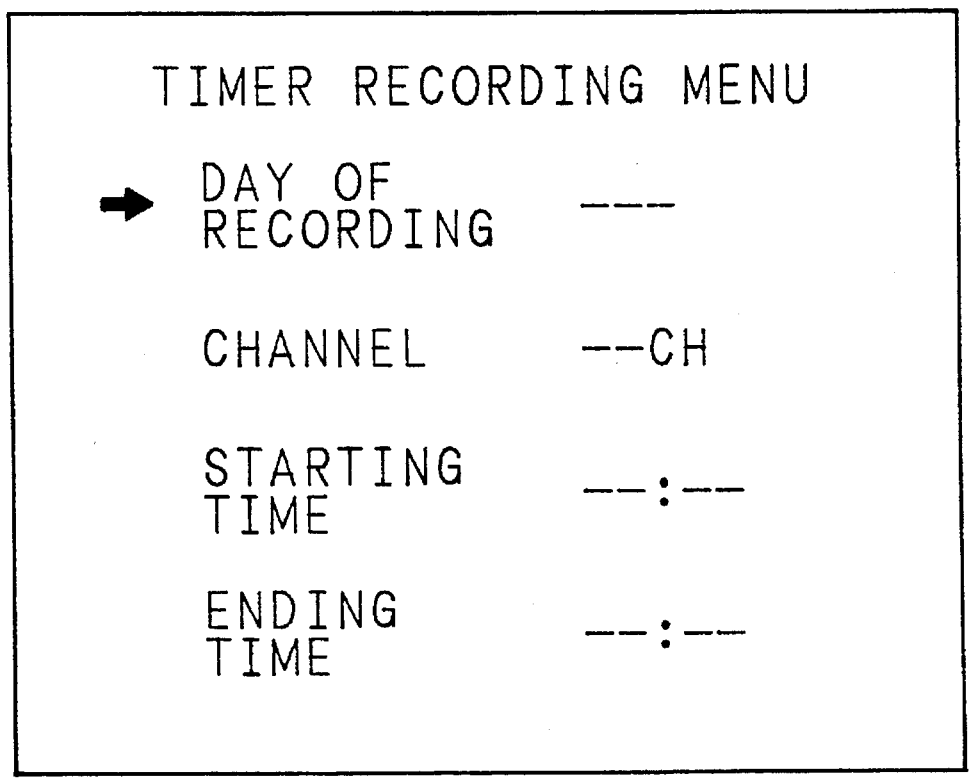
FIG. 6 is a diagram showing an example of a menu screen in the input apparatus of FIG. 5.

The operation of the input apparatus of the embodiment will be described with reference to an example of the display screen shown in FIG. 6.

When the menu key 11 is operated, the display is changed to a menu screen by the controller 2. The state judging circuit 6 monitors the contents of the displayed menu screen and the operation state of the selection key 12. Only when a main menu is displayed for the first time, the state judging circuit 6. detects this state. This detection causes the operation of the timer circuit 5 to be halted or ignored, and the candidates to be selected are displayed as blanks or struck by horizontal lines as shown in FIG. 6. The controller 2 does not enter the usual input operation mode until the selection key 12 is then operated. As a result, the display can be kept unchanged until the operator comprehends the way of operation, whereby the operation can be surely performed.

Figure 7:
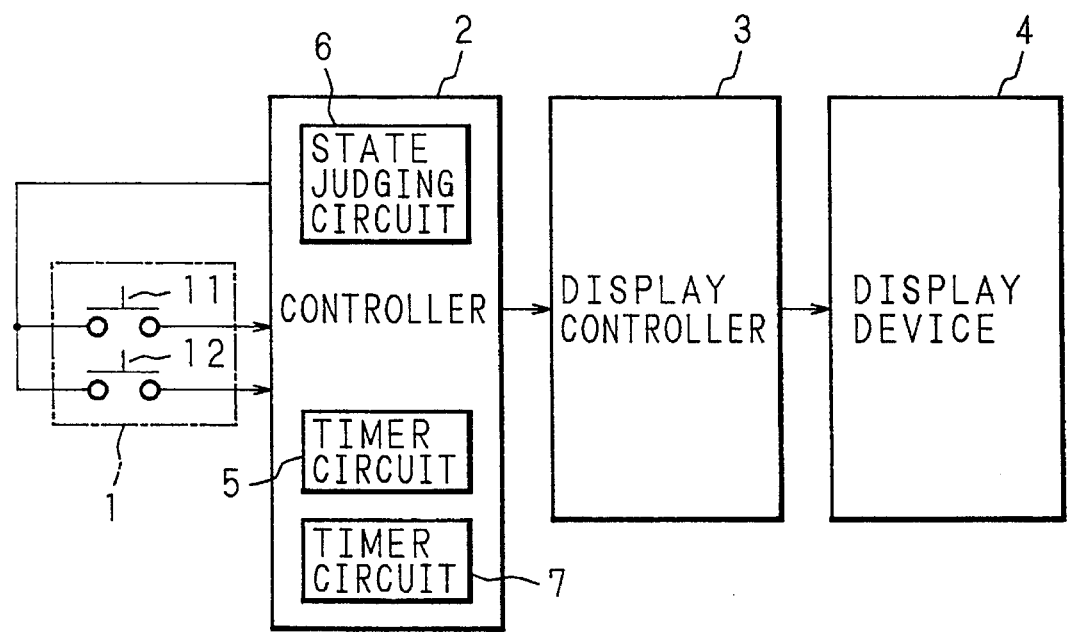
FIG. 7 is a diagram showing the configuration of a still further input apparatus of the invention.

In the configuration described above, in the case that the operation of the timer circuit 5 is ignored and the change of the menu is suppressed for one of the main menu screens, the selection key 12 may be continued to be unoperated for a long period time so that the menu display remains to be unchanged and this state continues. This inconvenience may be obviated by providing another timer circuit 7 which can measure a sufficiently long time period, in addition to the timer circuit 5 as shown in FIG 7, and by forcedly changing the state. More specifically, the controller 2 is programmed so that, on the basis of the operation of the other timer circuit 7, the menu display is returned to the previous one or the selection input mode is ended. Therefore, the process can be returned even when the selection key 12 is erroneously operated, and the menu selection operation can be restarted from the beginning. The settling of the measuring time period of the timer circuit 7 can be changed by the controller 2.

Figure 8:
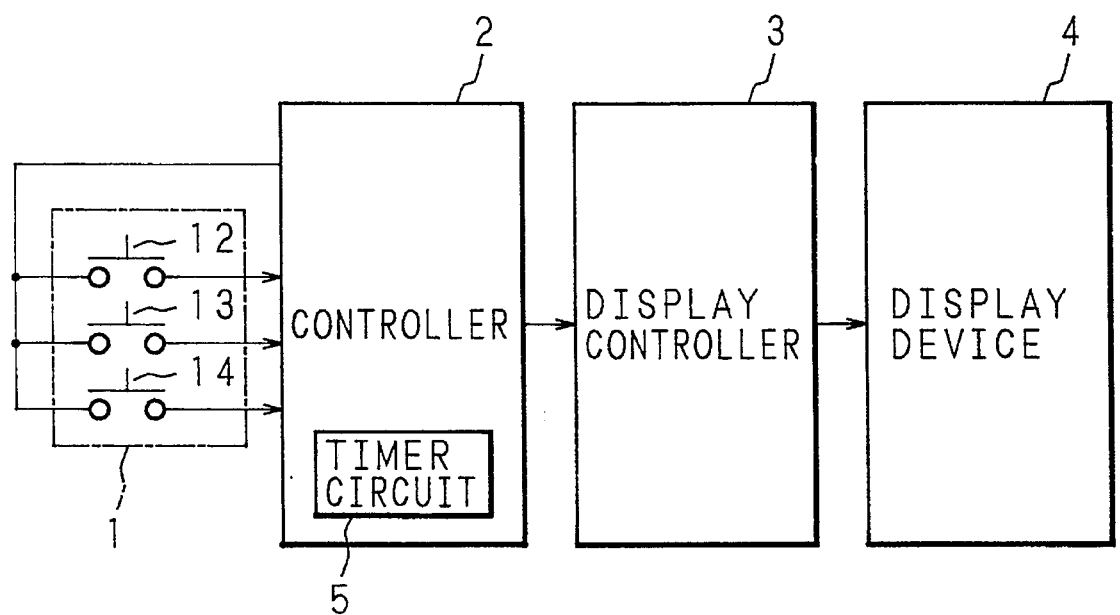
FIG. 8 is a diagram showing the configuration of a still further input apparatus of the invention.

FIG. 8 is a diagram showing the configuration of an input apparatus which is a still further embodiment of the invention. The embodiment of FIG. 8 is different from the embodiment of FIG. 4 in that the input key pad 1 is provided with a decision key 13 and a cancellation key 14 which function as auxiliary keys, in addition to the selection key 12.

In this configuration, the operation is in principle the same as that of the embodiments of FIGS. 3 and 4. When the decision key 13 is pressed while the selection through the selection key 12 remains undone and before the decision is done as a result of the operation of the timer circuit 5, however, the decision of the input can be performed in advance of the operation of the timer circuit 5. This allows a skilled operator to quickly perform the input of the required item while jumping the waiting time period of the timer circuit 5.

When the cancellation key 14 is operated before the menu screen proceeds to the next one as a result that the selection key 12 has remained to be unoperated, it is possible to perform various operations such as that the menu screen is returned to the previous one, that the input mode is ended so that the input operation is restarted from the beginning in the case that it has been erroneously done, that the selection input mode can be quickly ended after all. the required items have been input, and that the selection input mode which has been erroneously started is forcedly ended.

In the above-described embodiments, a single key is used as the selection key 12. In the case that there are many candidates, a selection key for the reverse direction may be further provided so that the selection operation is performed using the two selection keys, the forward selection key and the reverse selection key. In this case, when any key is not pressed during a predetermined time period in the menu selection operation, the selected candidate is decided.

Alternatively, the input apparatus may be provided with two or more selection keys and these selection keys may be classified depending on the frequency in use. This classification may be performed as follows: A selection key which is usually used (e.g., a selection key for setting the timer for recording) may be independently disposed, or a key relating to the operation mode of a VTR is separately disposed.

In the embodiments described above, the timer circuit 5 measuring the time period during which the selection key 12 of the input key pad 1 is not, operated measures only one kind of time period. With respect to some items, it takes a considerably long time period to set one of them. Therefore, the operation time period of the timer circuit 5 may be different for each of items, thereby reducing the number of possible erroneous operations.

The embodiments which are used for operating a VTR have been described above. The invention can be effectively applied also to input apparatus which are used for operating other kinds of AV apparatus or apparatus having a display screen.

As described above, according to the invention, the reaction in response to the operation of one key is made different from that produced when any key is kept unoperated for a predetermined time period. Hence, the invention can provide an input apparatus in which the operation to be conducted while viewing a menu screen on a screen can be easily performed and an input operation can be rapidly and surely conducted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An input apparatus comprising:

first input means for inputting a signal on the basis of an operation;

second input means for inputting a signal on the basis of an operation;

a timer which is reset by an input of a signal produced on the basis of an operation of said first input means and which outputs a control signal upon measuring a predetermined time period; and control means for controlling menu screen operations based on operation of said first input means, said second input means and said control signal of said timer, said control means displaying, on a display, one menu screen of a plurality of menu screens for selection based on operation of said second input means, said control means changing which of said plurality of menu screens are available for display based on operation of said first input means, and said control means selecting a currently displayed menu screen upon receipt of said control signal.

2. An input apparatus for inputting in an input session a set of information to affect a controller, comprising:

input means for inputting a signal on the basis of an operation;

a first-timer which is reset by an input of a signal produced on the basis of an operation of said input means and measures a first time period;

a second timer which is reset by an input of a signal produced on the basis of an operation of said input means and measures a second time period;

display means for displaying a plurality of menu screens;

judging means for judging whether the currently displayed menu screen of the plurality of menu screens is displayed for a first time and an operation state of said input means; and means for inputting first conditions for selecting a menu on the basis of an input of a signal due to an operation of said input means, for inputting second conditions for deciding a selected menu on the basis of an output of said judging means and when said first timer measures said first time period, and for inputting third conditions for switching an input operation on the basis of an output of said judging means and when said second timer measures said second time period.

3. An input apparatus for inputting in an input mode a set of information to affect a controller, comprising:

input means for inputting a signal on the basis of an operation;

a first timer which is reset by an input of a signal produced on the basis of an operation of said input means and measures a first time period;

a second timer which is reset by an input of a signal produced on the basis of an operation of said input means and measures a second time period which can be changeably set;

display means for displaying a plurality of menu screens;

judging means for judging whether the currently displayed menu of the plurality of menu screens is displayed for a first time and an operation state of said input means; and means for changing said second time period set in said second timer on the basis of a judging result of said judging means, for inputting first conditions for selecting a menu on the basis of an input of a signal due to an operation of said input means, for inputting second conditions for deciding a selected menu on the basis of an output of said judging means and when said first timer measures said first time period, and for inputting third conditions for switching an input operation on the basis of an output of said judging means and when said second timer measures said second time period.

4. A method for inputting information into a controller, comprising the steps of:

(a) receiving and recognizing a first signal of a first type;

(b) displaying, on a display, at least one main menu in response to the first signal of the first type;

(c) indicating a first of a plurality of sub-menu titles listed on the displayed main menu;

(d) starting the running of a timer for a predetermined time period;

(e) changing the indication of the plurality of sub-menu titles listed on the displayed menu and restarting the running of the timer for the predetermined time period, if a signal of a second type is received and recognized before the timer expires;

(f) repeating step (e) until the timer expires;

(g) selecting a sub-menu by displaying the sub-menu corresponding to the sub-menu title indicated when the timer expires;

(h) inputting information to the controller in response to a selection of an item displayed by the selected sub-menu.

5. The method of claim 4, wherein step (h) includes the steps of:

(h1) indicating a first of a plurality of selection items corresponding to the selected sub-menu;

(h2) starting the running of a timer for a predetermined time period;

(h3) changing the indication of the plurality of selection items corresponding to the selected sub-menu, and restarting the running of the timer for the predetermined time period, if a signal of the second type is received and recognized before the timer expires;

(h4) repeating step (h3) until the timer expires;

(h5) inputting information to the controller corresponding to the selection item indicated when the timer expired.

6. The method of claim 5, further including the steps of:

(i) judging whether a sub-menu has been displayed before; and (j) ignoring the expiration of the timer in step (h4) if it is judged in step (i) that the sub-menu has not been displayed before.

7. The method of claim 6 wherein step (j) includes ignoring the expiration of the timer until a signal of the second type is received and recognized during display of the selected sub-menu.

8. The method of claim 5, wherein step (f) includes repeating step (e) until the timer expires or receipt and recognition of a signal of a third type; and step (h4) includes repeating step (h3) until the timer expires or receipt and recognition of a signal of the third type.

9. The method of claim 5, wherein step (f) includes repeating step (e) until the timer expires or receipt and recognition of a signal of a third type; and step (h4) includes repeating step (h3) until the timer expires or receipt and recognition of a signal of the third type.

10. The method of claim 4 further comprising the steps of:

(i) after step (h), displaying a further sub-menu not previously selected corresponding to a sub-menu listed on the displayed main menu; and (j) repeating steps (h) and (i) until all information needed by the controller associated with the displayed main menu has been input.

11. The method of claim 10, further comprising the step of:

(k) after step (j) displaying all information input in conjunction with the last displayed main menu.

12. The method of claim 12, further comprising the step of:

(1) after step (k), receiving and recognizing a second signal of the first type, and ending the input operation in response to the third signal of the first type.

13. The method of claim 4, wherein step (f) includes repeating step (e) until the timer expires or receipt and recognition of a signal of a third type.

14. The method of claim 4, further including the steps of:

(i) receiving and recognizing a signal of a third type;

(j) returning to the most recently executed step of displaying a menu or a sub-menu in response to the recognition of the signal of a third type in step (i).

15. The method of claim 4, wherein signals of a first type and signals of a second type are generated by first and second button depressions, respectively.

16. The method of claim 4, wherein said step (b) sequentially displays, on said display, one or more of a series of main menus in response to the first signal of the first type received in step (a); and further comprising the steps following said step (b) of, (i) receiving and recognizing a second signal of the first type; and (j) ending the sequencing of the displaying in step (b) in response to the second signal of the first type by continuing the display of the last displayed main menu.

17. A method for inputting information into a controller, comprising the steps of:

(a) on a display, sequentially displaying one or more of a series of main menus in response to receiving and recognizing each of one or more first signals of a first type, respectively;

(b) indicating a first of a plurality of sub-menu titles listed on the last displayed main menu;

(c) starting the running of a timer for a predetermined time period;

(d) changing the indication of the plurality of sub-menu titles listed on the last displayed menu and restarting the running of the timer for the predetermined time period, if a signal of a second type is received and recognized before the timer expires;

(e) repeating step (d) until the timer expires;

(f) selecting a sub-menu by displaying the sub-menu corresponding to the sub-menu title indicated when the timer expires;

(g) inputting information to the controller in response to a selection of an item displayed by the selected sub-menu.

18. The method of claim 17, wherein step (g) includes the steps of:

(g1) indicating a first of a plurality of selection items corresponding to the selected sub-menu;

(g2) starting the running of a timer for a predetermined time period;

(g3) changing the indication of the plurality of selection items corresponding to the selected sub-menu, and restarting the running of the timer for the predetermined time period, if a signal of a second type is received and recognized before the timer expires;

(g4) repeating step (g3) until the timer expires;

(g5) inputting information to the controller corresponding to the selection item indicated when the timer expires.

19. The method of claim 18, wherein step (e) includes repeating step (d) until the timer expires or receipt and recognition of a signal of a third type; and step (g4) includes repeating step (g3) until the timer expires or receipt and recognition of a signal of the third type.

20. The method of claim 17, wherein step (e) includes repeating step (d) until the timer expires or receipt and recognition of a signal of a third type.

21. The method of claim 17, further including the steps of:

(h) receiving and recognizing a signal of a third type;

(i) returning to the most recently executed step of displaying a menu or a sub-menu in response to the recognition of the signal of a third type in step (h).

22. The method of claim 17, wherein signals of a first type and signals of a second type are generated by first and second button depressions, respectively.

23. A method for inputting information into a controller, comprising the steps of:

(a) receiving and recognizing a first signal;

(b) displaying, on a display, at least one main menu in response to the first signal;

(c) indicating a first of a plurality of sub-menu titles listed on the displayed main menu;

(d) starting the running of a timer for a predetermined time period;

(e) changing the indication of the plurality of sub-menu titles listed on the displayed menu and restarting the running of the timer for the predetermined time period, if a second signal is received and recognized before the timer expires;

(f) repeating step (e) until the timer expires;

(g) selecting a sub-menu by displaying the sub-menu corresponding to the sub-menu title indicated when the timer expires;

(h) inputting information to the controller in response to a selection of an item displayed by the selected sub-menu.

24. The method of claim 23, wherein step (h) includes the steps of:

(h1) indicating a first of a plurality of selection items corresponding to the selected sub-menu;

(h2) starting the running of a timer for a predetermined time period;

(h3) changing the indication of the plurality of selection items corresponding to the selected sub-menu, and restarting the running of the timer for the predetermined time period, if a third signal is received and recognized before the timer expires;

(h4) repeating step (h3) until the timer expires;

(h5) inputting information to the controller corresponding to the selection item indicated when the timer expires.

25. The method of claim 24 further comprising the steps of:

(i) after step (h), displaying a further sub-menu not previously selected corresponding to a sub-menu listed on the displayed main menu; and (j) repeating steps (h) and (i) until all information needed by the controller associated with the displayed main menu has been input;

(k) (m) after step (j), displaying all information input in conjunction with the displayed main menu;

(1) starting the running of the timer, and ending the inputting of information, including displaying, to the controller in response to the expiration of the timer.

26. The method of claim 24, wherein step (f) includes repeating step (e) until the timer expires or receipt and recognition of a signal of a type different from the first signal; and step (h4) includes repeating step (h3) until the timer expires or receipt and recognition of a signal of a type different from the first signal.

27. The method of claim 23, wherein step (f) includes repeating step (e) until the timer expires or receipt and recognition of a signal of a type different from the first signal.

28. The method of claim 23, further including the steps of:

(i) receiving and recognizing a signal of a type different from the first and second signals;

(j) returning to the most recently executed step of displaying a menu or a sub-menu in response to the recognition of a signal of a type different from the first and second signals in step (i).

29. The method of claim 23, wherein the signals are generated by button depressions.

30. The method of claim 23, further comprising the steps, preceding step (a) of:

(i) receiving and recognizing a signal; and (k) sequentially displaying, on said display, one or more of a series of main menus in response to the signal; and wherein said step (b) ends the sequencing of the displaying in step (k) in response to the first signal by continuing the display of the last displayed main menu.

31. A method for inputting information into a controller, comprising the steps of:

(a) receiving and recognizing a first signal of a first type;

(b) displaying, on a display, at least one main menu in response to the first signal of the first type;

(c) determining if the displayed menu has been displayed before;

(d) starting the running of a timer for a predetermined time period only if it is determined in step (c) that the displayed menu has been displayed before;

(e) indicating or changing the indication of the plurality of sub-menu titles listed on the displayed menu and starting or restarting the running of the timer for the predetermined time period, if a signal of a second type is received and recognized before the timer expires;

(f) repeating step (e) until the timer expires;

(g) selecting a sub-menu by displaying the sub-menu corresponding to the sub-menu title indicated when the timer expires;

(h) inputting information to the controller in response to a selection of an item displayed by the selected sub-menu.

32. The method of claim 31, wherein step (h) includes the steps of:

(h1) determining if the selected sub-menu has been displayed before;

(h2) starting the running of a timer for a predetermined time period only if it is determined in step (h1) that the selected sub-menu has been displayed before;

(h3) indicating or changing the indication of the plurality of selection items corresponding to the selected sub-menu, and starting or restarting the running of the timer for the predetermined time period, if a signal of a second type is received and recognized before the timer expires;

(h4) repeating step (h3) until the timer expires;

(h5) inputting information to the controller corresponding to the selection item indicated when the timer expires.

33. The method of claim 32, wherein step (f) includes repeating step (e) until the timer expires or receipt and recognition of a signal of a third type; and step (h4) includes repeating step (h3) until the timer expires or receipt and recognition of another signal of the third type.

34. The method of claim 31, wherein step (f) includes repeating step (e) until the timer expires or receipt and recognition of a signal of a third type.

35. The method of claim 31, further including the steps of:

(i) receiving and recognizing a signal of a third type;

(j) returning to the most recently executed step of displaying a menu or a sub-menu in response to the recognition of the signal of a third type in step (i).

36. The method of claim 31, wherein signals of a first type and signals of a second type are generated by first and second button depressions, respectively.

37. The method of claim 31, wherein said step (b) sequentially displays, on said display, one or more of a series of main menus in response to the first signal of the first type received in step (a); and further comprising the steps following said step (b) of, (i) receiving and recognizing a second signal of the first type; and (j) ending the sequencing of the displaying in step (b) in response to the second signal of the first type by continuing the display of the last displayed main menu.

38. A method for inputting information into a controller, comprising the steps of:

(a) receiving and recognizing a first signal of a first type;

(b) displaying, on a display, at least one main menu in response to the first signal of the first type;

(c) indicating a first of a plurality of sub-menu titles listed on the displayed main menu;

(d) starting the running of a first timer for a first predetermined time period and starting the running of a second timer for a second predetermined time period, longer than the first predetermined time period;

(e) judging whether the last displayed main menu has been displayed previously;

(f) changing the indication of the plurality of sub-menu titles listed on the displayed menu and restarting the running of the first timer for the predetermined time period, if a signal of a second type is received and recognized before the first timer expires or before the second timer expires if it is judged in step (e) that the main menu has not been displayed before;

(g) exiting input mode or returning to the displaying of main menus in step (b), if it is judged in step (e) that the main menu has not been displayed before and if the second time expires before receipt and recognition of a signal of the second type;

(h) repeating step (f) until the first timer expires;

(i) selecting a sub-menu by displaying the sub-menu corresponding to the sub-menu title indicated when the timer expires;

(j) inputting information to the controller in response to a selection of an item displayed by the selected sub-menu.

39. The method of claim 38, wherein step (j) includes the steps of:

(j1) indicating a first of a plurality of selection items corresponding to the selected sub-menu;

(j2) starting the running of the first timer for the first predetermined time period and starting the running of the second timer for the second predetermined time period;

(j3) judging whether the selected sub-menu has been displayed previously;

(j4) changing the indication of the plurality of selection items listed on the selected sub-menu and restarting the running of the first timer for the predetermined time period, if a signal of the second type is received and recognized before the first timer expires or before the second timer expires if it is judged in step (j3) that the sub-menu has not been displayed before;

(j5) exiting input mode or returning to the continuing display of the displayed main menu, if it is judged in step (j3) that the selected sub-menu has not been displayed before and if the second timer expires before receipt and recognition of a signal of the second type during display of the selected sub-menu;

(j6) repeating step (j4) until the first timer expires;

(j7) inputting information to the controller corresponding to the selection item indicated when the first timer expires.

40. The method of claim 38, wherein step (h) includes repeating step (f) until the timer expires or receipt and recognition of a signal of a third type.

41. The method of claim 38, further including the steps of:

(k) receiving and recognizing a signal of a third type;

(l) returning to the most recently executed step of displaying a menu or a sub-menu in response to the recognition of the signal of a third type in step (k).

42. The method of claim 38, wherein said step (b) sequentially displays, on said display, one or more of a series of main menus in response to the first signal of the first type received in step (a); and further comprising the steps following said step (b) of, (i) receiving and recognizing a second signal of the first type; and (j) ending the sequencing of the displaying in step (b) in response to the second signal of the first type by continuing the display of the last displayed main menu.

43. The method of claim 38, wherein signals of a first type and signals of a second type are generated by first and second button depressions, respectively.

\* \* \* \* \*